Figure 1:
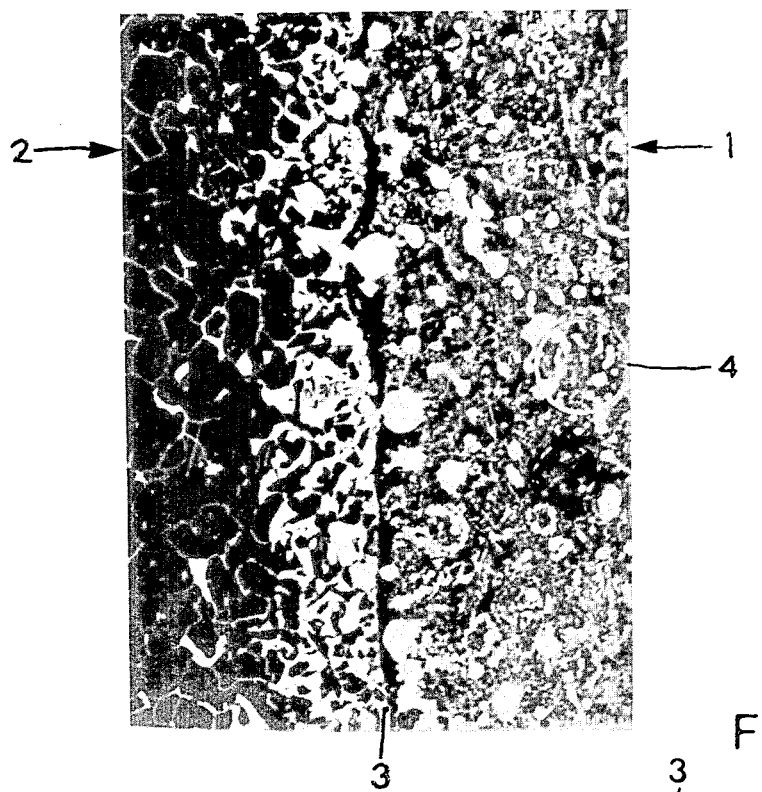
Figure 2:
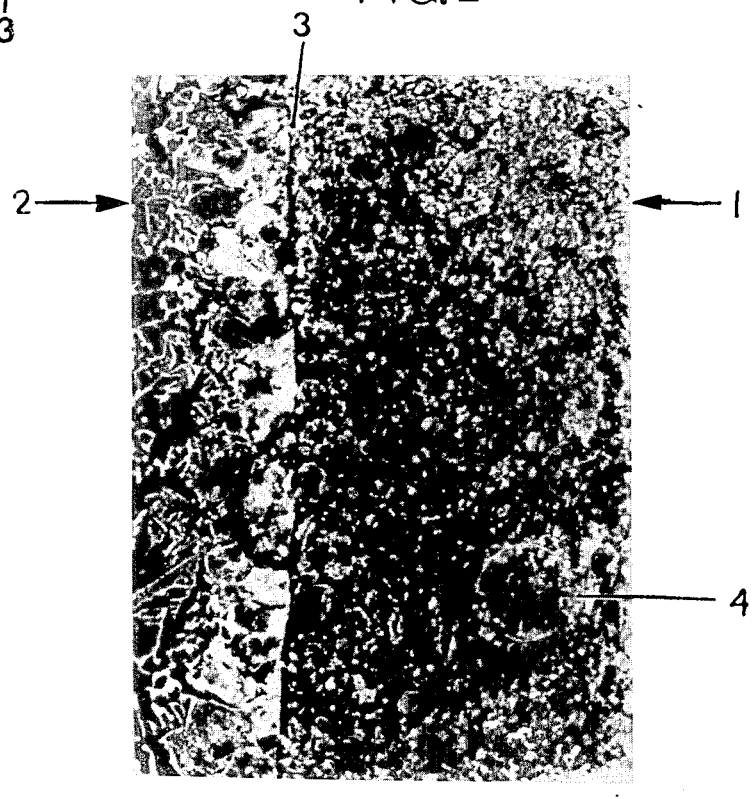

United States Patent [19]

MacDonald

[11] 4,231,994

[45] Nov. 4, 1980

[54] SEPARATION OF ZIRCONIUM FROM HAFNIUM BY SOLVENT EXTRACTION

[75] Inventor: David J. MacDonald, Reno, Nev.

[73] Assignee: The United States of America as represented by the Secretary of the Interior, Washington, D.C.

[21] Appl. No.: 69,677

[22] Filed: Aug. 27, 1979

[51] Int. Cl.³ .................... C01G 25/00; C01G 27/00
[52] U.S. Cl. ................................ 423/70; 423/73; 75/101 BE
[58] Field of Search ............. 423/70, 73; 75/101 BE

[56] References Cited

U.S. PATENT DOCUMENTS

| | | |
|---|---|---|
| 1,906,068 | 4/1933 | Jinemann . |
| 2,741,628 | 4/1956 | Plucknett ........................... 423/73 |
| 3,658,466 | 4/1972 | Otsuka ................................ 423/73 |

FOREIGN PATENT DOCUMENTS 874510  8/1961  United Kingdom ..................... 423/73

OTHER PUBLICATIONS

Sinegubova et al., "Atomic Energy Reviews," vol. 4, 1966, pp. 93–106.
Vinapor, "Russian Chemical Reviews," vol. 36, Jul. 1967, pp. 522–536.

*Primary Examiner*—Herbert T. Carter
*Attorney, Agent, or Firm*—William S. Brown; Donald A. Gardiner

[57] ABSTRACT

Separation of zirconium and hafnium by solvent extraction with a tertiary amine from sulfuric acid solution is improved by addition of water-soluble α-hydroxycarboxylic acid to the aqueous phase.

4 Claims, No Drawings

SEPARATION OF ZIRCONIUM FROM HAFNIUM BY SOLVENT EXTRACTION

Known processes for separation of zirconium from hafnium include liquid-liquid extraction from sulfuric acid feed solution by means of an extractant solution comprising an organic solvent and a high molecular weight tertiary amine. Such a process is described in U.S. Pat. No. 3,658,466. This procedure has, however, been found to yield a relatively low separation factor for separation of zirconium from hafnium, thereby requiring a large number of stages to achieve sufficent product recovery and purity.

It has now been found, according to the process of the invention, that the separation factor may be substantially improved by addition to the feed solution of water-soluble α-hydroxycarboxylic acid. The separation factor, α, refers to the tendency of zirconium to extract into the organic phase relative to the tendency of hafnium to extract into the organic phase during solvent extraction. It is defined by the equation:

$$\alpha = [Zr]_{org}[Hf]_{aq}/[Zr]_{aq}[Hf]_{org}$$

The feed solution treated according to the process of the invention consists of a zirconium- and hafnium-bearing dilute sulfuric acid solution, which is generally derived by treatment of zircon sand. Concentrations of zirconium and hafnium in the solution will generally range from about 0.03 to 0.3 and 0.0003 to 0.003 moles per liter, respectively. Optimum concentration of sulfuric acid will vary with the specific organic solvent, tertiary amine and α-hydroxycarboxylic acid employed in the process, as well as with the concentrations of the zirconium and hafnium. Generally, however, a sulfuric acid concentration of about 0.5 to 2 moles per liter is satisfactory.

The preferred organic solvent is kerosene. However, other solvents conventionally employed in solvent extraction processes, e.g., naphtha, cyclohexane, xylene, etc., may be used. Suitable volume ratios of organic solvent to feed solution will generally range from about 5:1 to 1:5.

The tertiary amine is of a molecular weight sufficient to be soluble in the organic solvent but essentially insoluble in water. Preferred amines are trioctyl amine and Alamine 336 ($C_{12}$–$C_{18}$ amine). However, other tertiary amines such as trinonyl amine, tridecyl amine and tri-iso-octyl-amine may be used. Suitable concentrations of the amine in the organic solvent will generally range from about 5 wt-pct to 30 wt-pct. Since the feed comprises a sulfuric acid solution, the tertiary amine of the extraction solution is preferably converted to the acid sulfate form by eqiulibration with sulfuric acid prior to extraction.

The extractant solution preferably also contains a modifier for promoting the efficiency of phase separation in the extraction process, although this is not essential to the process. Long chain alcohols of the type described in the above-mentioned patent, e.g., decanol, are useful for this purpose. Amounts of the alcohol preferably range from about 2.5 wt-pct to 15 wt-pct of the organic solvent.

The α-hydroxycarboxylic acid employed in the process of the invention is water soluble, and essentially insoluble in the organic solvent. Accordingly, it is added to the feed solution and remains in the aqueous phase throughout the extraction process. Lactic acid, glycolic acid and citric acid have been found to give particularly good results in the process of the invention. However, other α-hydroxycarboxylic acids, such as malic acid, 2-hydroxyisobutyric acid, or glyceric acid, may also be used. Optimum amounts of the α-hydroxycarboxylic acid will vary with the specific feed solution and extractant solution and are best determined experimentally. However, a useful range of concentration of the acid is about 0.5 to 10 moles per mole of zirconium in the feed solution, with a preferred range of about 2 to 6 moles per mole of zirconium.

The extraction process is conducted according to conventional liquid-liquid solvent extraction procedures employing an organic liquid extractant and an aqueous feed solution. This may involve a single stage mixing and separation of organic and aqueous phases in any conventional mixer-settler apparatus, or the use of a multistage countercurrent solvent extraction system of greater efficiency. Neither pressure nor temperature are critical in the extraction process and ambient conditions will, therefore, usually be employed.

Following separation of the organic and aqueous phases, recovery of the zirconium from the organic phase is accomplished by conventional means such as scrubbing with an aqueous solution of ammonium carbonate or an alkali metal carbonate as described in U.S. Pat. No. 3,658,466. The α-hydroxycarboxylic acid is contained in the aqueous phase, i.e., in the extractor raffinate, from which it may be recovered for reuse by conventional means such as extraction with isopropyl ether as described in U.S. Pat. No. 1,906,068.

The process of the invention will now be more specifically illustrated by means of the following example.

EXAMPLE

To one liter of an aqeuous feed solution containing 5.82 grams per liter of zirconium and 0.104 grams per liter of hafnium in 1.0 molar sulfuric acid was added 74 grams of lactic acid, to provide a solution containing four moles of lactic acid per mole of zirconium.

An organic extractant solution was then prepared by equilibrating with 1.0 molar sulfuric acid a solution consisting of 10 wt-pct trioctylamine and 5 wt-pct decanol in kerosene. One liter of this solution was then added to the above-prepared aqeuous solution, and the mixture was agitated in a separatory funnel for a period of about one minute.

Organic and aqueous phases were then separated by draining off the aqeuous phase from the bottom of the funnel. Analysis of the separated phases showed a zirconium concentration of 3.42 grams per liter in the organic extract phase and 2.40 grams per liter in the aqueous raffinate, with hafnium concentrations of 0.0094 gram per liter in the extract phase and 0.0948 gram per liter in the raffinate. These data indicate a zirconium/hafnium single-stage separation factor of 14.4. In the absence of lactic acid, an otherwise identical procedure results in a zirconium/hafnium separation factor of 9.1.

I claim:

1. In a process for separation of zirconium from hafnium by solvent extraction of an aqueous sulfuric acid feed solution containing the metals with an organic extractant comprising a solution of a high molecular weight tertiary amine in an organic solvent and separation of the organic and aqueous phases, the improvement comprising adding to the feed solution prior to extraction about 0.5 to 10 moles per mole of zirconium in the feed solution of a water-soluble and organic solvent-insoluble α-hydroxycarboxylic acid.

2. The process of claim 1 in which the extractant comprises a solution of trioctylamine in kerosene.

3. The process of claim 1 in which the α-hydroxycarboxylic acid consists essentially of lactic acid, glycolic acid or citric acid.

4. The process of claim 3 in which the α-hydroxycarboxylic acid consists essentially of lactic acid.

* * * * *